(12) United States Patent
Arksey et al.

(10) Patent No.: US 9,066,462 B2
(45) Date of Patent: Jun. 30, 2015

(54) WORKING TOOLS WITH WEAR RESISTANT WORKING SURFACES FOR AGRICULTURAL IMPLEMENTS AND OTHER APPLICATIONS

(71) Applicant: Atom Jet Industries (2002) Ltd., Brandon (CA)

(72) Inventors: Don Arksey, Brandon (CA); Noel Lagarde, Brandon (CA); Marcel Lanoie, Brandon (CA)

(73) Assignee: Atom Jet Industries (2002) Ltd., Brandon, Manitoba (CA)

( * ) Notice: Subject to any disclaimer, the term of this patent is extended or adjusted under 35 U.S.C. 154(b) by 142 days.

(21) Appl. No.: 13/787,983

(22) Filed: Mar. 7, 2013

(65) Prior Publication Data

US 2014/0083341 A1  Mar. 27, 2014

Related U.S. Application Data

(60) Provisional application No. 61/642,068, filed on May 3, 2012.

(51) Int. Cl.

| A01B 3/00 | (2006.01) |
|---|---|
| A01B 15/00 | (2006.01) |
| A01B 15/18 | (2006.01) |
| A01B 23/02 | (2006.01) |
| A01B 49/06 | (2006.01) |
| A01C 5/06 | (2006.01) |
| A01C 7/20 | (2006.01) |

(52) U.S. Cl.
CPC . *A01B 3/00* (2013.01); *A01C 5/062* (2013.01); *A01B 49/06* (2013.01); *A01B 23/02* (2013.01); *A01B 15/00* (2013.01); *A01C 7/20* (2013.01); *A01B 15/18* (2013.01)

(58) Field of Classification Search
CPC ............ A01C 5/062; A01C 5/06; A01C 7/20; A01C 7/201; A01C 7/206; A01C 7/208; A01B 23/02; A01B 23/00; A01B 15/00; A01B 15/02; A01B 3/00; A01B 15/18; A01B 49/06; A01B 49/04; A01B 49/00
See application file for complete search history.

(56) References Cited

U.S. PATENT DOCUMENTS

| 4,187,626 A | 2/1980 | Greer et al. |
|---|---|---|
| 5,081,774 A | 1/1992 | Kuwano |
| 5,217,081 A | 6/1993 | Waldenstroem |
| 2003/0221600 A1* | 12/2003 | Rowlett et al. ............... 111/154 |
| 2008/0229986 A1 | 9/2008 | Arksey |

FOREIGN PATENT DOCUMENTS

| DE | 2825318 | 2/1979 |
|---|---|---|
| WO | 2010136208 | 12/2010 |

* cited by examiner

*Primary Examiner* — Christopher J Novosad
(74) *Attorney, Agent, or Firm* — Kyle R. Satterthwaite; Ryan W. Dupui; Ade & Company Inc.

(57) ABSTRACT

A composite working tool, for example a ground engaging tool of an agricultural implement, features a body composed of a first material and an insert composed of a distinct second material of greater hardness than the first material to define wear resistant surfaces of the tool. The tool body has an opening recessed thereinto from an exposed exterior surface fully surrounding the opening on all sides thereof, and the insert is attached to the body in a position at least partially received within the opening, for example by brazing. The increases the wear life of the body and provides greater mounting strength over surface-mounted wear inserts of the prior art.

17 Claims, 4 Drawing Sheets

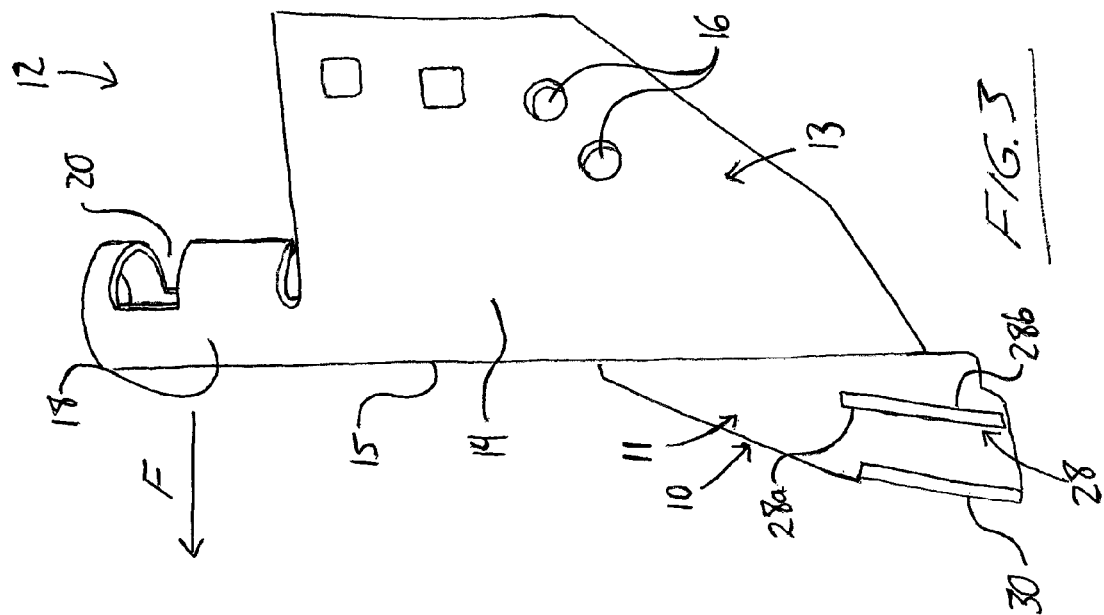
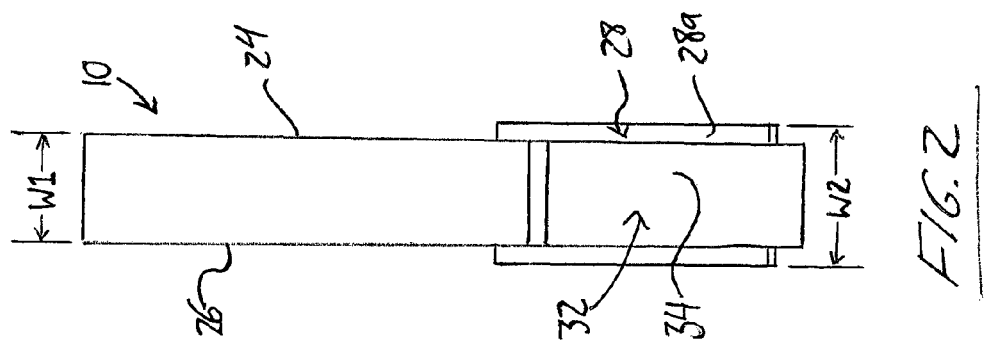
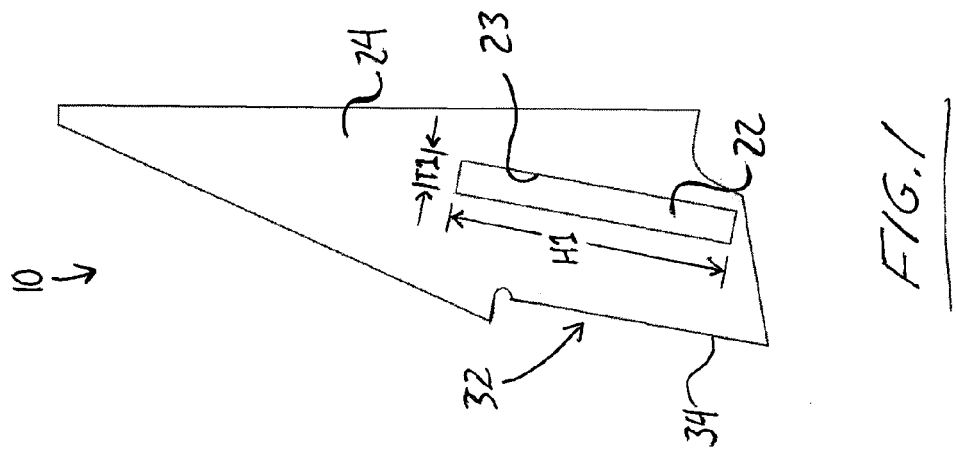

WORKING TOOLS WITH WEAR RESISTANT WORKING SURFACES FOR AGRICULTURAL IMPLEMENTS AND OTHER APPLICATIONS

CROSS REFERENCE TO RELATED APPLICATIONS

This application claims benefit under 35 U.S.C. 119(e) of U.S. Provisional Patent Application Ser. No. 61/642,068, filed May 3, 2012.

FIELD OF THE INVENTION

The present invention relates to composite tools employing a body of a first material and one or more inserts of a harder second material to form wear resistant working surfaces, and more particularly to a unique mode of attachment between the insert and the body to improve the mounting strength therebetween and provide longer wear resistance.

BACKGROUND OF THE INVENTION

In the fields of ground working tools, for example for agricultural or construction purposes, and various other working tools, for example in construction or manufacturing, it is known to use composite designs where a main body of the tool is formed of one material, and portions of the tool that will engage the ground or material being worked are formed of different material or somehow treated to provide greater hardness at these portions for increased durability, decreased wear, and longer tool life.

For example, it is well known to use tungsten carbide inserts on a tool body of a different metal material. Conventionally, the use of carbide inserts on agricultural ground workings tools for opening furrows in the ground has relied on brazing of the carbide inserts onto an exterior surface of the main body of the tool. When carbide pieces are brazed onto the side of the main body to reduce wear, the braze union is subjected to shearing forces as the tool is conveyed forwardly through the ground. A braze subject to shear forces is more susceptible to failure than one that is instead only subject to compression forces.

Accordingly, there is room for improvement in the attachment of wear resistant inserts to protect the sides of tool bodies, and applicant has developed a new mode of attachment to provide a greater strength in the bond between the tool body and the insert.

SUMMARY OF THE INVENTION

According to a first aspect of the invention there is provided a composite working tool comprising a body composed of a first material and an insert composed of a distinct second material of greater hardness than the first material to define wear resistant surfaces of the tool, wherein the tool body has an opening recessed thereinto from an exposed exterior surface fully surrounding the opening on all sides thereof, and the insert is attached to the body in a position at least partially received within the opening.

A projecting portion of the insert may be left outside the opening to extend beyond the exterior surface of the body to define the wear resistant working surfaces, which thereby project outward from the body.

Alternatively, an end of the insert may lie flush with the exterior surface of the body.

Preferably the insert is bonded to the body inside the opening at one or more walls of the opening on one or more sides of the insert.

Preferably the insert is bonded to the body on less than all sides of the insert to leave space between the insert and body on at least one side thereof to accommodate different expansion/contraction rates of different materials among the body, insert and bond.

Preferably the insert is bonded to body inside the opening by brazing material.

Preferably the second material is tungsten carbide.

Preferably the first material is a metal other than tungsten carbide.

Preferably the opening is defined by a through-hole passing fully through the body.

The insert may pass fully through the through-hole in order to project from both ends of the through hole to define the wear resistant working surfaces on opposing sides of the body.

In another embodiment, the insert may project outward from only side of the body, in which case the insert may be flush with the exterior surface of the body at the opposite side thereof.

In yet another embodiment, the insert may be flush with the exterior surface of the body at both ends of the opening.

The body may be that of a ground opening tool of an agricultural implement.

In some embodiments, the ground opening tool has a material delivery channel situated in a position trailing a leading portion of the body in a forward working direction of the agricultural implement to deliver material into a furrow formed by the ground opening tool during use of the agricultural implement, each projecting portion of the insert being situated in a position leading the material delivery material tube in the forward working direction of the agricultural implement. Other ground opening tools not used for material delivery, such as potato tines or deep rippers, may lack any such material delivery channel, as they are not intended for delivery of seed, fertilizer or other materials into the ground.

The material delivery channel may be defined by a material delivery tube that is distinct from the body of the ground opening tool.

Preferably the material delivery tube is attached to the body of the ground opening tool on a trailing side thereof.

According to a second aspect of the invention there is provided a ground working tool for an agricultural implement, the ground working tool comprising a body composed of a first material and an insert composed of a distinct second material of greater hardness than the first material to define wear resistant ground working surfaces of the tool, wherein the tool body has an opening recessed thereinto from an exposed exterior surface fully surrounding the opening on all sides thereof, and the insert is attached to the body in a position at least partially received within the opening.

At each end of the opening, the insert may be flush with the exterior surface of the body, or have a projecting portion of the insert left outside the opening to extend beyond the exterior surface of the body to define the wear resistant working surfaces, which thereby project outward from the body.

According to a third aspect of the invention there is provided a method of producing a tool with wear resistant working surfaces, the method comprising:

(a) obtaining a tool body that is composed of a first material and that has an opening recessed into the tool body from an exposed exterior surface thereof that fully surrounds the opening on all sides thereof;

(b) obtaining an insert composed of a distinct second material of greater hardness than the first material;

(c) attaching the insert to the body in a position with at least a first portion the insert received in the opening.

A second projecting portion of the insert may be left outside the opening to extend beyond the exterior surface of the body and define the wear resistant working surfaces, which thereby project outward from the body.

Preferably attaching the insert to the body comprises bonding the insert to the body inside the opening.

Attaching the insert to the body may comprise bonding the insert to the body inside the opening on multiple sides of the insert, and may comprise bonding the insert to the body inside the opening on all sides of the insert.

Alternatively, and more preferably, attaching the insert to the body may comprise bonding the insert to the body on fewer than all sides of the insert, for example on only side of the insert in order to leave room between the insert and the body to accommodate different rates of expansion or contraction among materials employed in the body, insert and bond.

Preferably attaching the insert to the body comprises brazing the insert to the body inside the opening.

Preferably step (a) comprises machining the opening in the tool body.

Preferably step (a) comprises cutting a through-hole in the body.

Where the opening is through-hole, the insert may project from or be flush with both ends of said through hole in the position in which said insert is attached to the body so as to define the wear resistant working surfaces on opposing sides of the body.

BRIEF DESCRIPTION OF THE DRAWINGS

In the accompanying drawings, which illustrate exemplary embodiments of the present invention:

FIG. 1 is a side elevational view of a first embodiment body for use in production of a first style of opener for an agricultural implement, the body having a rectangular slot cut transversely through it for receiving a wear resistant insert.

FIG. 2 is a front elevational view of the body of FIG. 1 after insertion of the wear resistant insert into the slot to pass transversely through the body to present wear resistant working surfaces projecting outward from opposite sides of the body.

FIG. 3 is a side view of a completed opener featuring the body and wear resistant insert of FIGS. 1 and 2.

DETAILED DESCRIPTION

Figure 7:
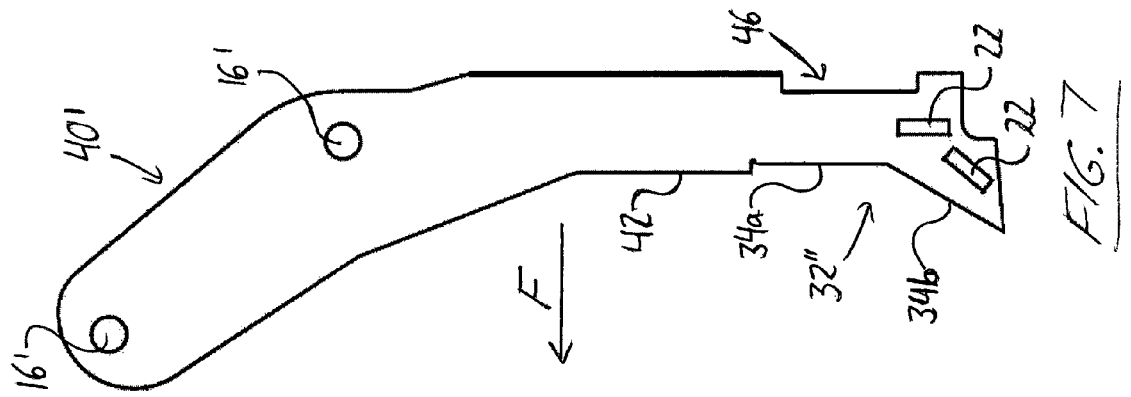
FIG. 7 is a side elevational view of a third embodiment body use in production of a third style of opener for an agricultural implement, the body having two rectangular slots cut transversely through it for receiving respective wear resistant inserts.

FIG. 1 shows a metal body 10 used to form the furrow-forming member 11 or portion of a style of opener 12 shown in FIG. 3 for use on a seeder or drill, or fertilizer applicator, for opening furrows in the ground and delivering seed or fertilizer into the furrows. Aside from unique features of the furrow forming member, the rest of the opener of FIG. 3 is of a known configuration commercially available from Atom Jet Industries of Brandon, Manitoba Canada. The opener 12 features a piece of metal plate 13 bent to define two nearly parallel side walls 14 extending in a common direction rearward from the bend, which defines an upright front end 15 of the bent plate. Holes 16 are provided in aligned pairs in the side walls 14 near the rear ends thereof furthest from the bent front end 16 for use in fastening the bent plate to a support shank depending downward from a frame of the implement. The side walls 14 extend from the bottom end of the bent front end 15 up toward, but without reaching, the top end of the bend.

Above the side walls 14, the bent front end 15 extends upward past the lateral side walls 14, where, it extends through nearly a full 360 degree curve about the same vertical axis the lower half the front end 15 is bent 180-degrees around to define a seed tube 18 projecting upward from the side walls 14 over an open top end of a hollow interior space left between those side walls. At a distance above the lateral side walls 14, a seed hose clamping slot 20 is defined in the seed tube wall to extend therethrough over an approximately 180 degree span therearound at a position opposite the curved front edge 15 and passing through a vertical slot left by the slightly less than 360 degree periphery of the seed tube 18. The seed tube 18 has a diameter suitable to receive the free discharge end of a seed hose of the seeder or drill through the seed tube's open top end. With a seed hose so inserted, the seed tube 18 closes nearly fully around the seed hose above and below the seed hose clamping slot 20. A hose clamp is positioned around the seed tube 18 at the seed hose clamping slot 20 and tightened around the seed hose through this slot to clamp the seed hose in place against the curved front edge 15 of the seed tube 18.

The metal body and harder inserts of tungsten carbide or other wear resistant material described herein below define the furrow forming member 11 of the opener 12, which is welded or otherwise fixed to the front end 15 of the bent plate to lie at the bottom end thereof to form a leading portion of the opener 12 that leads the rest of the opener when the same is moved forward under towing of the implement in a forward working direction F. Pulling the opener along the ground with the furrowing member 11 depending down into the earth through the surface thus forms a furrow in the ground. A portion of the hollow interior space defined between the lateral sides walls 14 of the bent plate directly beneath the seed tube 18 and immediately behind the bent front edge 15 defines a generally vertical seed channel or passage through which seed can pass from the hose in the seed tube down to an opening left between the side walls at the bottom ends thereof to deposit the seed into the furrow.

Where the metal body 10 differs most significantly from prior art openers of this type, is that a rectangular slot-shaped hole 22 is cut through the body 10 in a transverse direction to create a closed rectangular channel passing fully through the metal body from one flat side face 24 to the other 26. The solid body 10 remains intact fully around the slot-shaped hole 22. That is, the solid metal body 10, and both its two opposing parallel flat sides 24, 26, fully surround the slot-shaped hole 22 on all sides thereof. A tungsten carbide insert 28 of rectangular volume is sized to be slidable into the slot-shaped hole 22. Considering the width W1 of the slot-shaped hole 22 to be the dimension measured between the opposing side faces 24, 26 of the body 10, the height H1 of the slot-shaped hole 22 to be the one of its two dimensions in the plane of either side face of the body that is measured more vertically than horizontally, and the thickness of the slot T1 to be the other of its two dimensions in the plane of the body's side face 24, 26, the height H2 and thickness T2 of the rectangular insert 28 are selected to be just slightly less than the height H1 and thickness T1 of the slot-shaped hole 22, while the width W2 of the insert 28 equals or exceeds the width W1 of the body 10. When having a greater width than the body, as best shown in FIG. 2, the insert can be partially received within the slot-shaped hole 22 to sit in a position spanning fully therethrough to leave a portion of the insert's width W2 projecting outward from the respective open end of the slot-shaped through hole 22 outwardly past each side face 24, 26 of the body 10. On the other hand, an insert of equal width to the body can be positioned to lie flush with each side face of the body. One end of the insert 28 is inserted into the hole from an end thereof at a respective side 24, 26 of the body 10, and the insert is pushed onward through the hole until the inserted end passes fully through the hole to be flush with or project from the opposite end thereof, leaving a central portion of the insert 10 inside the hole 22, and the opposite end of the insert flush with the end of the hole or outside the hole at the side of the body from which the insert was inserted.

With the insert so positioned, it's then fixed in place by brazing of the insert to the body within the hole 22. The brazing process is performed such that the melted brazing material seeps into the small clearance between the insert and the surrounding boundary of the rectangular hole 22 on the back side of the insert facing away from the direction of travel. Not only is the strength of brazed connection of the insert to the body improved over a conventional flush-mounting of a carbide piece where the carbide is brazed onto a respective side face 24, 26 of the body 10, but the fitting of the insert within the body also provides further improvement to the support of the carbide piece compared to a conventional flush mounting to a side face of the body, as impact of the front face 28a of the insert 28 against the earth as the opener is pulled therethrough in the forward working direction F of the implement is resisted by interface between the rear face 28b of the insert and the respective forward facing rear wall 23 of the hole 22.

The brazed connection inside the body is arranged to take on compressive forces, rather than the shear forces experienced by the conventional flush mounting of inserts at the exterior of the body. The body also has longer wearability, as it begins to wear in front of the insert, but the harder material of the insert stops or interrupts the wearing effect in the direction of movement. The body thus tends to wear a little in front of the insert, and then a little at a distance rearward of the insert as the as the earth washes around the insert at the sides of the body. Brazing on only one side of the insert leaves small gaps between the insert and the body on the other sides thereof, whereby different rates of expansion and contraction of the different materials under heating and cooling can be accommodated. The chances of the insert breaking under stresses resulting from such heating and cooling, for example as experienced during the brazing process, is therefore minimized.

As shown in FIG. 3, a conventional flush-mounted piece of tungsten carbide 30 may be mounted at the front face of the body 10, where a lower portion of the front end of the body 10 may be recessed, as shown at 32 in FIG. 1, for this purpose. Thus, the leading area 34 of the lower portion of the body 10 that lies below ground level during use of the opener is covered by the flush-mounted front carbide piece 30 to provide a greater hardness than the softer metal of the body 10 so as to reduce the rate of wear as the opener is pulled along the ground to displace the earth at this leading portion of the opener. In a conventional manner, the width of the front carbide piece 30 may slightly exceed the width W1 of the body, for example having the same width W2 as the slot-mounted carbide piece 28, so as to project slightly outward beyond each side face 24, 26 of the body 10 so as to not only protect the leading area 34 of the body 10, but also the leading portions of the side wall faces 24, 26 therebehind. The slot-mounted carbide piece 28 positioned further back along the body 10 provides similar protection to the trailing portions of the body's side walls and the seed-delivery and shank-mount structure trailing the body 10, by projecting laterally outward beyond both sides of these components to cut a furrow width slightly exceeding the width of these components to minimize wear to these softer metal structures. Alternatively, the insert may be flush with the side faces of the body, thus not cutting a wider furrow than needed by the body, but instead just increasing the body's wearability by maintaining its width as the less wear-resistant body material narrows under the wearing away of its sides.

In the first embodiment, the front carbide piece 30 and the slot-mounted rear carbide piece 28 lie in parallel planes each of which is obliquely sloped so that the upper end of the carbide piece 28, 30 is titled rearward out of a vertical plane by an acute angle. In other words, the carbide pieces are not perpendicular to the forward working direction F of the opener, but rather tilt rearward from bottom to top. This is just one example however, as the orientation of the insert may be selected according to where the body is expected to experience the most wear or require the greatest strength.

Figure 4:
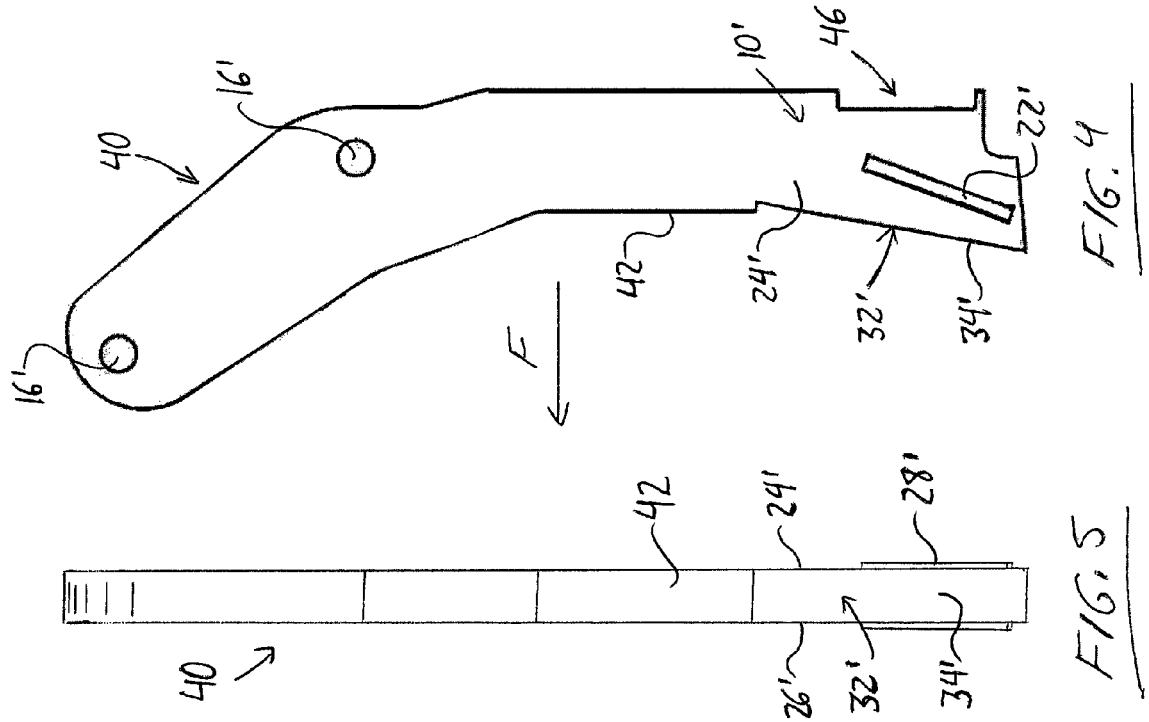
FIG. 4 is a side elevational view of a second embodiment body use in production of a second style of opener for an agricultural implement, the body again having a rectangular slot cut transversely through it for receiving wear resistant inserts.
Figure 5:
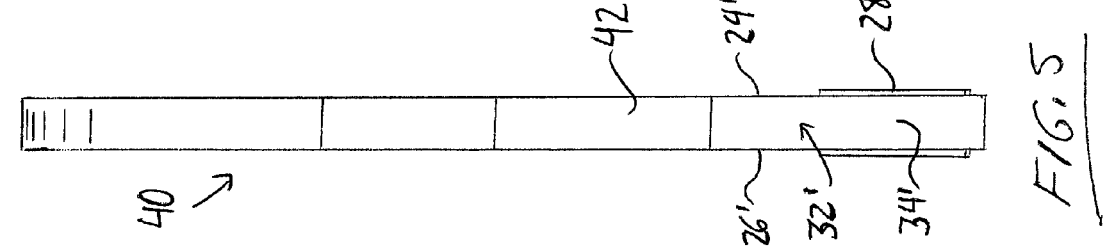
FIG. 5 is a front elevational view of the body of FIG. 4 after insertion of the wear resistant inserts into the slot to pass transversely through the body to present wear resistant working surfaces projecting outward from opposite sides of the body.
Figure 6:
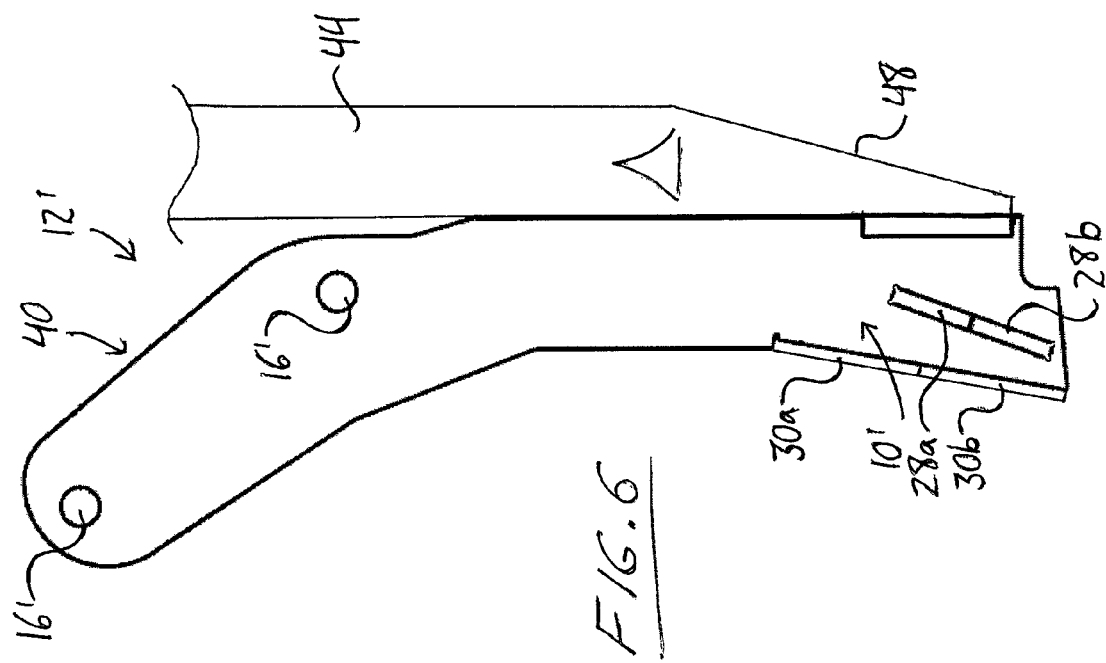
FIG. 6 is a side view of a completed opener featuring the body and wear resistant insert of FIGS. 4 and 5.

FIGS. 4 to 6 illustrate a second embodiment opener for an agricultural drill or seeder to demonstrate that the principles of the present invention can be applied to various opener types. The opener 12' is of a type used on a parallel link precision hoe drill, where the furrow forming body 10' is an integral extension of a shank 40 that attaches to a parallel linkage at a distance rearward from where the leading ends of parallel links are pivotally supported at vertically spaced points on a transverse member of the implement frame. The illustrated shank 40 features mounting holes 16' near it upper end for use in fastening the shank 40 to a shank mount on the parallel linkage. Below this upper mounting portion, the shank depends vertically downward therefrom to define the furrow forming body 10' that depends into the ground to form the furrow therein as the implement is towed in the forward working direction F.

The furrow forming lower portion 10' of the shank has some features in common with the body of the first embodiment, particularly two parallel, vertically-oriented flat side faces 24', 26' that are joined together at leading ends thereof by an inclined edge that slopes rearward from bottom to top at a small acute angle relative to a vertical plane normal to the forward working direction F. This inclined front edge is recessed relative to the vertical front edge portion 42 of the shank 40 above the carbide-equipped furrowing portion 10', as shown at 32' in FIG. 4, in order to accommodate two rectangular tungsten carbide pieces 30a, 30b flush-mounted one over the other at this recessed leading area 34' of the furrow forming portion 10' for the same purposes as described above for the front carbide 30 of the first embodiment.

The furrow forming portion 10' of the shank 40 features a slot-shaped through hole 22' passing transversely therethrough in the same manner as the first embodiment, except that the slot shaped hole 22' does not lie parallel to the front carbide pieces 30a, 30b, instead being tilted in the same direction out of a vertical plane normal to the forward working direction F as the coplanar front pieces 30a, 30b, but at a slightly greater acute angle. This provides improved strength and durability in the mounting of the insert, as the upward and rearward slope of the insert relative to the front of the body means that the thickness of the material between the insert and the front end of the body increases moving in an upward direction. Accordingly, even when the front of the body wears away far enough back to reach the lower end of the insert, the front side of the insert is still housed in place by a significant thickness of body material further up. The second embodiment also differs from the first in that two smaller rectangular carbide inserts 28a, 28b are positioned one over the other within the slot-shaped hole 22' with brazing material therebetween, thus collectively defining an overall insert structure like that of the single-piece larger rectangular insert of the first embodiment. The second embodiment also differs from the first in that the insert does not reach as far up the body as the flush mounted front carbide, as the opener body style of the second embodiment tends not to wear as high.

As shown in FIG. 6, a seed or fertilizer tube 44 depends vertically downward behind the trailing edge of the shank 40, and is fixed thereto, for example by welding at a recessed portion 46 of the shank's trailing edge at the lower furrow forming portion 10' of the shank 40. The seed tube 44 defines a channel or passage through which seed or granular fertilizer is delivered into the furrow opened in the ground. In the illustrated embodiment, the seed tube 44 is tapered at a lower portion thereof to narrow towards the bottom end of the tube, creating a sloped rear 48 at this lower portion of the tube 44. The sloped rear is closed over an upper portion thereof, but is left open between the interior of the tube 44 and the outside environment at the reaming lower portion so as to define an outlet through which seed or granular fertilizer can fall from the delivery tube 44 into the furrow cut in the ground by the furrow forming portion 10' of the shank. The front carbide pieces 30a, 30b and the rear carbide insert 28' project from both side faces of the shank 40 to define the working surfaces that cut through the soil at the sides of the shank 40 to form a furrow of a sufficient width to accommodate the seed tube 44 trailing behind them.

Figure 8:
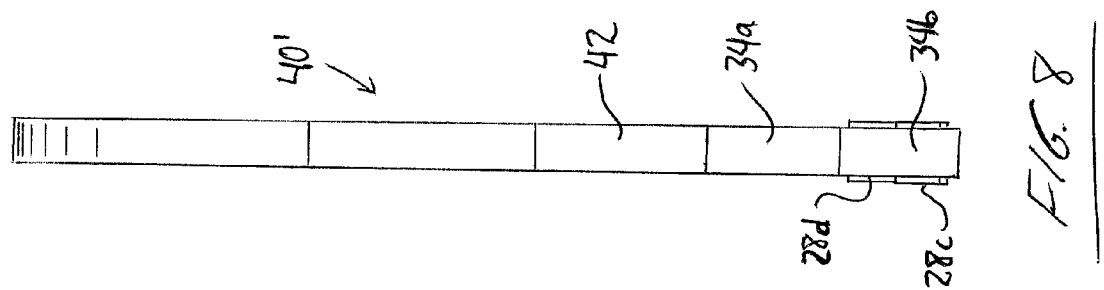
FIG. 8 is a front elevational view of the body of FIG. 7 after insertion of the wear resistant inserts into the slots to pass transversely through the body to present wear resistant working surfaces projecting outward from opposite sides of the body.
Figure 9:
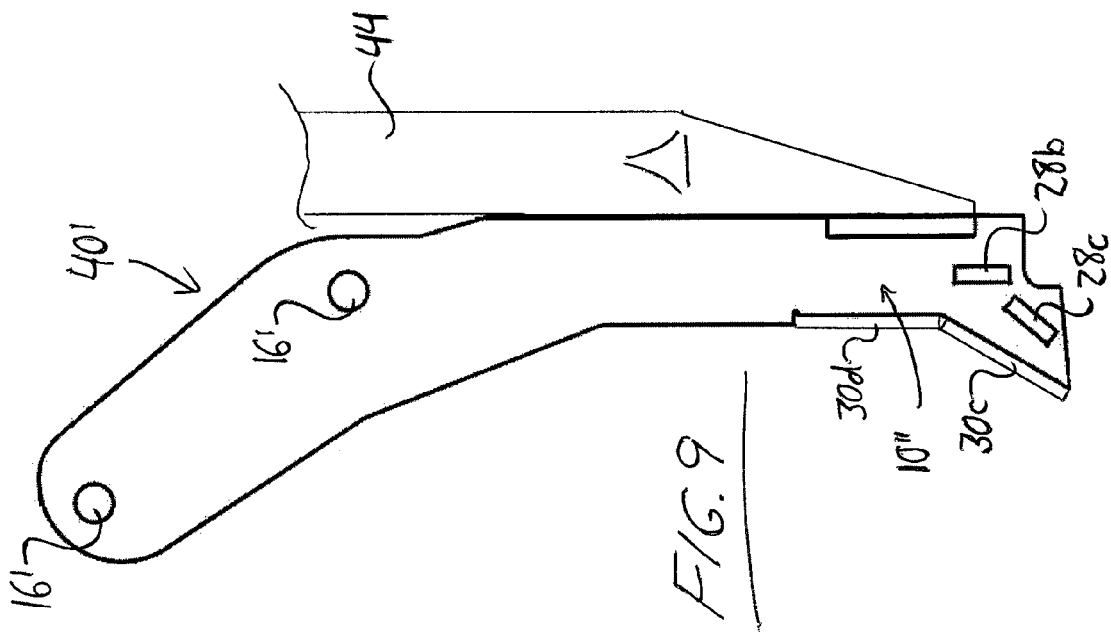
FIG. 9 is a side view of a completed opener featuring the body and wear resistant insert of FIGS. 7 and 8.

FIGS. 7 to 9 show a third embodiment, showing a variation of the shank design of the second embodiment. The shank 40' has the same upper mounting portion as the second embodiment, but has some changes to the lower furrow forming portion 10''. The front edge recess 32'' of the lower portion 10'' is divided into two sections, which define a vertically oriented upper area 34a of the front edge lying in a plane normal to the forward working direction, and an obliquely sloped lower area 34b of the front edge that is tilted out of a vertical plane normal to the forward working direction F in the same direction as the leading area 34' of the second embodiment shank 40, but by a greater angle. Each of the front edge sections has a respective flush-mounted rectangular carbide piece 30c, 30d brazed thereon in a conventional manner. The third embodiment also differs in that the single slot-shaped through-hole and respective single carbide insert of the first two embodiments is replaced with a pair of slot-shaped through holes 22a, 22b and two respective carbide inserts 28c, 28d. The first hole 22a and corresponding carbide insert 28c is located nearer the bottom end of the shank 40' and nearer the sloped lower area 34b at the bottom end of the shank's leading edge than the other hole 22b and insert 28d, and is tilted out of a vertical plane normal to the forward wording direction F in the same direction as the lower front edge area 34a at an angle equal or similar thereto. The second hole 22b and the corresponding insert 28d lie parallel to the upper front edge area 34b at a position above and behind the first insert 28a. The two carbide inserts 28c, 28d collectively span from near the bottom end of the shank up to the corner defined between the two recessed front edge sections 34a, 34b.

Figure 10:
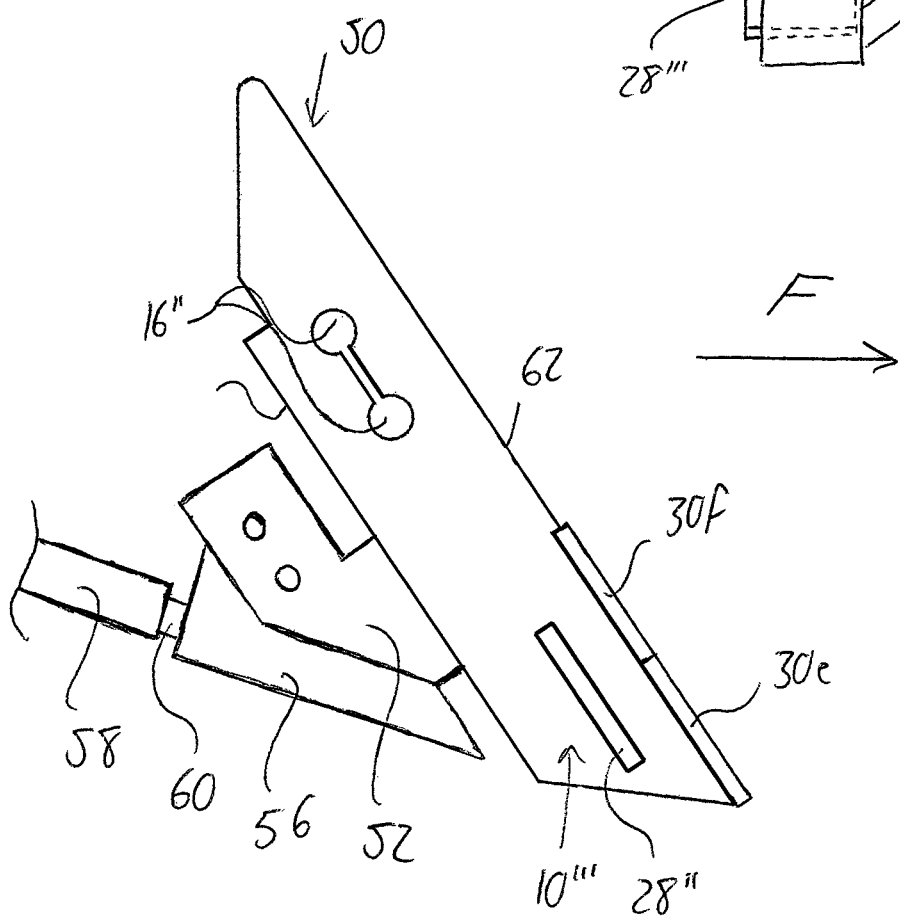
FIG. 10 is a side elevational view of a fourth embodiment opener for an agricultural implement employing a wear resistant insert mounted in a transverse through-hole in a furrow-forming body of the opener.

The application of slot-mounted carbide inserts to furrow openers is not limited to openers deliver granular material, such as seed, granular fertilizer or a combination thereof, as demonstrated by the FIG. 10 illustration of a knife opener 12'' for application of anhydrous ammonia fertilizer. The opener 12'' features a knife 50 having an upper portion configured with mounting holes 16'' for use in bolting the knife 50 to the shank of a fertilizing implement. An insulation support bracket 52 is fixed to the rear edge 54 of the knife to trail therebehind and carry an insulating insert 56 of nylon or other thermally insulative material in the shadow of the knife. A hose 58 of an anhydrous ammonia fertilizer delivery system couples to an inlet of a metal conduit 60 that passes through the insulation insert to define a delivery channel or passage. The conduit passes through the insulating insert to discharge the anhydrous ammonia downward therefrom into the furrow opened in the ground by a lower portion of the knife 50 that depends downward from the knife's upper portion to define an integral furrow opening body 10'''.

This furrow opening body 10''' shares features with the previous embodiments, particularly a recessing of the leading front edge 62 of the knife over a partial height thereof extending upward from the bottom end of this edge 62 in order to mount two front carbide pieces 30e, 30f one over the other at the leading area of the furrow opening portion 10''' of the knife 50. A single slot-shaped through hole extends transversely through the knife from one of the two parallel side faces thereof to the other as in the first two embodiments, and likewise receives one or more rectangular inserts brazed to the wall(s) of the hole to bond the insert(s) to the body.

It will be appreciated that although the illustrated embodiments are described in terms of furrow openers for agricultural purposes, the described use of a through hole for mounting a wear resistant insert on a tool body may be employed for ground working tools used in other applications, for example in the construction industry, or for working tools intended for use on other materials. For example, use of tungsten carbide is also employed for metal machining and forming tools, woodworking tools, mining/rock tools, etc. It will be appreciated that while the illustrated embodiments employ symmetric mounting of an insert within a through hole so as to project equally from opposite ends of the hole, other applications likewise employing an opening that recesses into the body are contemplated. For example, other embodiments may feature one or more inserts that project from only one end of a through hole, one or more inserts that project unequally from both ends of a through hole, or that feature an insert having one end received in a recessed opening that does not pass fully through the body and the other end projecting from the body to define a working surface at only one end of the insert. While the illustrated embodiments employ through holes and inserts of rectangular cross-section normal to the hole axis that transverses the tool body, other embodiments may employ other cross-sectional shapes. Likewise, while the illustrated inserts have rectangular front and rear faces, these shapes may also vary, and so ends of the inserts need not necessarily lie parallel to the planes of the exterior body surfaces around the insert-receiving opening.

Figure 11:
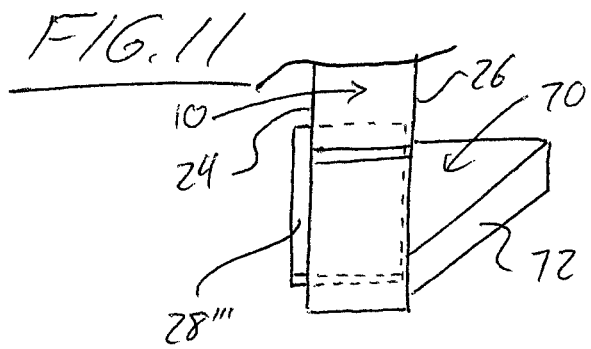
FIG. 11 is a front elevational view a side-banding opener having a body like that of FIG. 1, but with an insert that projects to only one side of the body, particularly on a side thereof opposite a wing-shaped lateral outlet on one side of the opener.

FIG. 11 is a partial front elevational view of a side-banding opener having a similar configuration to the first embodiment of FIGS. 1 to 3, but with a wing projecting laterally outward from the bottom of the portion of the opener through which the material delivery extends so as to define a rearward facing material outlet positioned laterally outward from the side walls 14 of this portion of the opener. The tip body of this embodiment differs from the first in that the insert 28''' thus projects laterally outward from the tip body on only one side thereof, specifically on the side thereof opposite the wing 70. On the wing side of the tip body, the insert 28''' instead lies flush with the side face of the tip body. In a conventional manner, a carbide wing piece 72 is mounted to an upward and rearward sloping leading edge of the wing 70. Other embodiments may have the insert positioned flush at both sides of the surrounding body, and for example may include a paired-row opener having two rearward facing laterally positioned outlets situated behind respective wings on both sides of opener, or a wide-spread opener having a single large outlet spanning from one side of the opener across to the other behind a pair of such wings.

It will also be understood that although the illustrated embodiments employ tungsten carbide inserts on softer metal bodies, other materials of different relative hardness may likewise be used in similar combination to form composite tools employing a harder material at the working surfaces that are expected to experience the most wear during use of the tool.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A composite working tool comprising a body composed of a first material and an insert composed of a distinct second material of greater hardness than the first material to define wear resistant surfaces of the tool, wherein the toot body has an opening recessed thereinto from an exposed exterior surface fully surrounding the opening on all sides thereof, the insert is attached to the body in a position at least partially received within the opening, and the insert is bonded to the body by brazing material disposed between the insert and one or more of a plurality of boundary walls of the opening that surround the insert on all sides thereof.

2. The working tool of claim 1 wherein a projecting portion of the insert is left outside the opening to extend beyond the exterior surface of the body to define the wear resistant surfaces, which thereby project outward from the body.

3. The working tool of claim 1 wherein an end of the insert lies flush with the exterior surface of the body.

4. The working tool of claim 1 wherein the insert is bonded to the body on less than all sides of the insert to leave space between the insert and body on at least one side thereof to accommodate different expansion/contraction rates of different materials among the body, insert and bond.

5. The working tool of claim 4 wherein the insert is bonded to the body on only one side of the insert.

6. The working tool of claim 1 wherein the second material is tungsten carbide.

7. The working tool of claim 6 wherein the first material is a metal other than tungsten carbide.

8. The working tool of claim 1 wherein the opening is defined by a through-hole passing fully through the body.

9. The working tool of claim 8 wherein the insert passes fully through the through-hole in order to project from both ends of the through hole to define wear resistant surfaces on opposing sides of the body.

10. The working tool of claim 1 wherein the insert projects outward from only one side of the body.

11. The working tool of claim 10 wherein the insert is flush with the exterior surface of the body at a second side of the body opposite the side from which the insert projects.

12. The working tool of claim 1 wherein the insert is flush with the exterior surface of the body at both ends of the opening.

13. The working tool of claim 1 wherein the body is that of a ground opening tool of an agricultural implement.

14. The working tool of claim 13 wherein the ground opening tool has a material delivery channel situated in a position trailing a leading portion of the body in a forward working direction of the agricultural implement to deliver material into a furrow formed by the ground opening tool during use of the agricultural implement, each projecting portion of the insert being situated in a position leading the material delivery material tube in the forward working direction of the agricultural implement.

15. The working tool of claim 14 wherein the material delivery channel is defined by a material delivery tube that is distinct from the body of the ground opening tool.

16. The working tool of claim 15 wherein the material delivery tube is attached to the body of the ground opening tool on a trailing side thereof.

17. The working tool of claim 1 wherein the body has a leading area that leads a remainder of the body in a forward working direction of the tool and the opening is recessed into the body in a direction transverse to the forward working direction at a location trailing the leading area of the body.

* * * * *